United States Patent
Subramaniam

(10) Patent No.: US 10,728,744 B2
(45) Date of Patent: Jul. 28, 2020

(54) TRANSMISSION OUTSIDE OF A HOME NETWORK OF A STATE OF A MEC APPLICATION

(71) Applicant: HEWLETT PACKARD ENTERPRISE DEVELOPMENT LP, Houston, TX (US)

(72) Inventor: Senthil Kumar Subramaniam, Chennai (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/965,254

(22) Filed: Apr. 27, 2018

(65) Prior Publication Data

US 2019/0335320 A1  Oct. 31, 2019

(51) Int. Cl.
  *H04W 8/24* (2009.01)
  *H04L 29/08* (2006.01)
  *H04W 4/24* (2018.01)

(52) U.S. Cl.
  CPC .......... *H04W 8/24* (2013.01); *H04L 67/2842* (2013.01); *H04L 67/10* (2013.01); *H04W 4/24* (2013.01)

(58) Field of Classification Search
  CPC ...................................................... H04W 8/24
  See application file for complete search history.

(56) References Cited

U.S. PATENT DOCUMENTS

| 10,110,495 | B1 * | 10/2018 | Sabella | H04M 15/66 |
| 2013/0237203 | A1 * | 9/2013 | Oertle | H04W 8/245 |
| | | | | 455/418 |
| 2018/0109590 | A1 * | 4/2018 | Rao | H04L 67/04 |
| 2018/0242204 | A1 * | 8/2018 | Zhu | H04W 36/0033 |
| 2018/0270780 | A1 * | 9/2018 | Xiong | H04W 8/22 |
| 2019/0045409 | A1 * | 2/2019 | Rasanen | H04W 36/0016 |

FOREIGN PATENT DOCUMENTS

| WO | WO-2017071924 A1 | 5/2017 |
| WO | WO-2017098810 A1 | 6/2017 |
| WO | WO-2017117044 A1 | 7/2017 |

OTHER PUBLICATIONS

Arif Ahmed and Ejaz Ahmed, "A Survey on Mobile Edge Computing," 10th IEEE International Conference on Intelligent Systems and Control, 2016, pp. 1-8, IEEE.

Intel Corporation, "Real-world Impact of Mobile Edge Computing (MEC)," White Paper, Jun. 30, 2016, pp. 1-3.

Pavel Mach and Zdenek Becvar, "Mobile Edge Computing: a Survey on Architecture and Computation Offloading," Mar. 13, 2017, pp. 1-28.

Tieto Corporation, "Mitigating the Operation and Maintenance Challenges of the Next Generation Mobile Networks," Nov. 7, 2017, pp. 1-20.

* cited by examiner

*Primary Examiner* — Kevin M Cunningham
(74) *Attorney, Agent, or Firm* — Hewlett Packard Enterprise Patent Department

(57) ABSTRACT

Examples herein relate to a state of a multi-access edge computing (MEC) application. Examples disclose the identification of a device that is capable of executing the MEC application. In response to the identification of the device executing the MEC application, caching at a MEC platform within a home network for the device, the state of the MEC application and associated data for the device. The examples transmit the state of the MEC application and associated data to a different MEC platform located outside of the home network.

20 Claims, 6 Drawing Sheets

TRANSMISSION OUTSIDE OF A HOME NETWORK OF A STATE OF A MEC APPLICATION

BACKGROUND

Wireless communication networks have increased in popularity with the advent of wireless devices, such as smartphones, mobile devices, etc. Such wireless communication networks provide both data and voice communications. Accordingly, a subscriber may refer to a wireless device that has an account with a communication service provider (CSP). Each subscriber is associated with a profile definition, referred to as the profile data that includes such information as which domain and/or respective networking component the mobile device is attached to, time of attachment, charging characteristics, policies for network access, type of device, provided services, etc.

The increased popularity of wireless communications have also increased development of mobile technologies. One such mobile technology, multi-access edge compute or mobile edge compute, referred to as MEC, provides network architecture concepts that enable cloud computing capabilities at an edge of the communication networks.

BRIEF DESCRIPTION OF THE DRAWINGS

In the accompanying drawings, like numerals refer to like components or blocks. Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
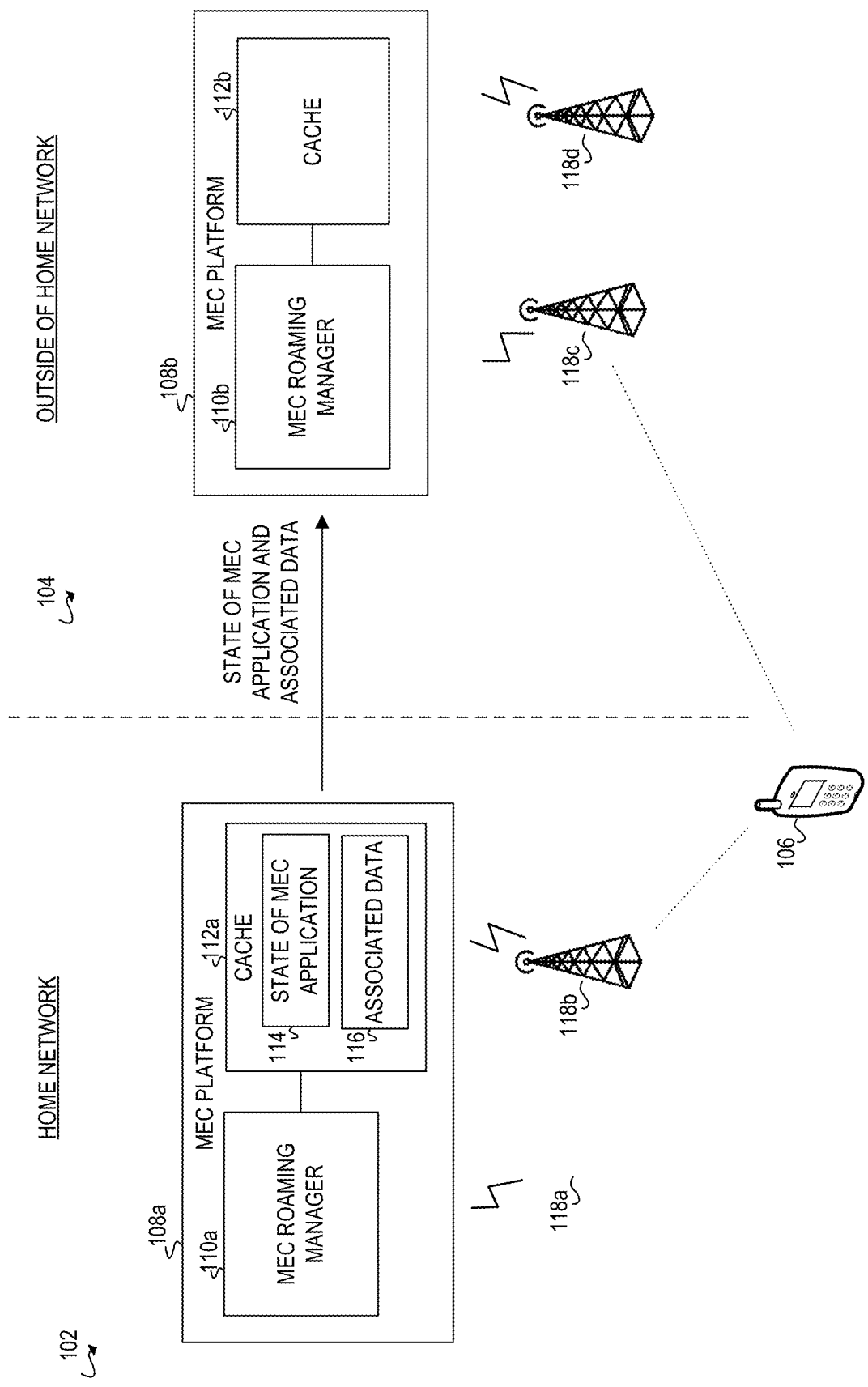
FIG. 1 illustrates an example system including a home network at which a MEC platform caches a state of a MEC application and associated data and transmits to a different MEC platform outside of the home network in accordance with the present disclosure.

Multi-access edge computing, (MEC), may also be referred to as multi-access edge compute, is a standard by European Telecommunications Standards Institute (ETSI) that involves a network architecture concept that enables cloud computing capabilities and IT service environment at an edge of a communication network. In a MEC architecture, computing and storage resources are placed in closer proximity to the mobile devices they service. The idea is that executing applications and performing related processing tasks closer to the mobile device, network congestion is reduced and applications are able to perform more efficiently.

When mobile devices roam from its home network to other communication providers' networks, subscriber data and associated application information are also moved from the home network to the other providers' networks. This may create problems for those highly mobile applications, such as an autonomous vehicle that by its nature moves from network to network. Additional issues may also arise if the home communication provider may have a roaming agreement in place with partner communication providers. In this situation, the application and subscriber data are moved from the home network MEC platform to the partner provider's MEC platform. The move of the subscriber data and associated applications increases the latency as the application state may be rebuilt again at the new MEC platform.

Accordingly, the present disclosure provides a mechanism that ensures mobile MEC applications continue throughout various networks. The idea ensures that the mobile device continues to operate the MEC application without impact. The disclosure synchronizes a state of the MEC application across multiple MEC platforms both inside and outside of the home network. This synchronization means the MEC application continues service regardless of where the device executing the MEC application is located. As such, certain examples described herein synchronize the state of MEC application across multiple MEC platforms.

In another example, the present disclosure also transmits the state of the MEC application and associated data to those MEC platforms located adjacently to where the device is residing. In this implementation, both the home network and outside of the home network (e.g., partner networks), there are multiple MEC platforms at which to cache the data; however, it may be imprudent to cache at every MEC platform. As such, the data may be transmitted to those MEC platforms that are located adjacently to the MEC platform at which the device may be located. This creates a much more efficient mechanism such that the MEC application continues operation even when the device is roaming in partner network. This allows the device to continue operation of the MEC application with minimal delay and interruption.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Additionally, the term "MEC" is meant to include a network architecture concept that enables cloud computing capabilities and an IT service environment at the edge of the communications network. As such, "MEC" may refer to multi-access edge compute and/or mobile edge computing. Further the term, "MEC application" may refer to those programs, algorithms, code, software that is executable by a processing resource to enable functionality of MEC. Additionally, the term "home network" refers to a communication system and architecture managed by a particular service provider. The terms "partner network," "visited network," and "outside of home network" refers to a communication system and architecture managed by a different service provider and as such, these terms may be used interchangeably throughout the document.

The foregoing disclosure describes a number of example implementations for transmission of the state of the MEC application across MEC platforms. The disclosed examples may include systems, devices, computer-readable storage media, and methods for transmission of the state of the MEC application. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

FIG. 1 illustrates an example system including home network 102 and outside of home network 104. Home network 102 includes MEC platform 108a, MEC roaming manager 110a, cache 112a, base stations 118a-118b, while outside of home network (e.g., partner network) 104 includes MEC platform 108b, MEC roaming manager 110b, cache 112b, and base stations 118c-118d. Home network 102 may initially identify a device 106 that is capable of or currently executing a MEC application. Based on the identification, MEC roaming manager 110a may cache a state of the MEC application and associated data within cache 112a as at modules 114-116. This data may be transmitted to MEC platform 108b outside of the home network 104 so that upon device 106 roaming within the partner network 104 and/or based upon a periodic basis, MEC platform 108a transmits this data. Home network 102 represents the communication network managed by a particular communication service provider (CSP), while outside of home network 104 represents the communication network managed by a different CSP. Alternatively, network 104 is considered a partner network to home network 102. Meaning, both CSPs may have a service agreement that allows partnership between networks 102 and 104 such that when device(s) enter the other CSP's network, the device(s) may be allowed services. The networks 102 and 104 in FIG. 1 represents a communication system such as a wireless mobile telecommunications system to provide network access, data services, and/or voice services for device(s) 106. Implementations of the networks 102 and 104 include at least one or a combination of 2G, 3G, 4G, 5G, Long Term Evolution (LTE) network, Software Defined Network (SDN), Internet Protocol Multimedia System (IMS), virtual network, Evolved Packet System (EPS), Global System for Mobile Communications (GSM), or other type of communications system capable of providing network access, data services, and voice services to a group of subscribers and/or mobile devices.

Device 106 is a mobile component that may connect wirelessly to home network 102 and/or outside of home network 104 such as a partner's network. As such, device 106 provides network access, data communications, and/or voice communications to a subscriber (not illustrated). Device 106 may be identified based on execution of the MEC application and/or capability of the execution of the MEC application. In this example, the device 106 may currently be executing the MEC application and/or may store the MEC application without current execution. MEC platform 108a identifies the device 106 to determine if device 106 is currently executing the MEC application and/or has the capability of executing the MEC application. Making this determination allows MEC platform 108a to retrieve the state of the MEC application and associated data for transmission to the other MEC platform 108b considered outside of the home network 104. This example highlights the mobility of device 106 between networks 102 and 104, such that device 106 may roam from MEC platform to MEC platform. To maintain execution of the MEC application without interruption or delay, the state of the MEC application and associated data is transmitted to those other MEC platforms to continue execution of the MEC application. Implementations of device 106 include wireless devices, such as smartphones, mobile devices, portable computing devices, tablets, mobile computing devices, servers, or other type of wireless device capable of attaching to networks 102 and 104.

MEC platforms 108a-108b are components in each respective network 102 and 104 that include MEC roaming manager 110a-110b and cache 112a-112b. As such, MEC platform 108a-108b include the infrastructure at which the edge computing is performed. In an implementation, the MEC platforms 108a-108b are considered a stack that includes the software executable by a processing resource (not illustrated) and hardware components located at each layer of networks 102 and 104 to provide the functionality of multi-access edge computing (MEC). In this implementation, a MEC platform is located at the data center layer, EPC layer, and base station layer. This means that at each layer of networks 102 and 104, there is at least one MEC platform capable to caching the state of the MEC application and associated data. This implementation is discussed in detail in a later figure. Implementations of MEC platforms 108a-108b include electronic circuitry (i.e., hardware) such as an integrated circuit, programmable circuit, application integrated circuit (ASIC), controller, processor, semiconductor, processing resource, chipset, or other type of hardware component, or alternatively, MEC platforms 108a-108b may include instructions (e.g., stored on a machine-readable medium) that, when executed by a processing resource (not illustrated) manages MEC roaming managers 110a-110b and cache 112a-112b.

MEC roaming managers 110a-110b track device 106 by attachment of device 106 to corresponding base stations 118a-118d. Accordingly, MEC roaming managers 110a-110b identify when device 106 is roaming outside of home network 104 and transmits the state of the application and associated data. Implementations of MEC roaming managers 110a-110b include electronic circuitry (i.e., hardware) such as an integrated circuit, programmable circuit, application integrated circuit (ASIC), controller, processor, semiconductor, processing resource, chipset, or other type of hardware component capable of receiving the state of the MEC application and associated data. Alternatively, MEC roaming managers 110a-110b may include instructions (e.g., stored on a machine-readable medium) that, when executed by MEC platforms 108a-108b and/or processing resource (not illustrated) receives the state of the MEC application and associated data.

Cache 112a-112b are exclusive to respective MEC platform 108a and 108b and may cache the state of the MEC application and associated data as at modules 114-116. Implementations of cache 112a-112b include a data storage, data store, cache, data partition, memory, volatile memory, data repository, non-volatile memory, Random Access Memory (RAM), an Electrically Erasable Programmable Read-Only Memory (EEPROM), a storage drive, a memory cache, network storage, or other type of storage capable of storing the state of the MEC application and associated data as at modules 114-116.

At modules 114-116, MEC platform 108a may cache the state of the MEC application and associated data at cache 112a. The state of the MEC application is the condition that the MEC application is in at a specific time, while the associated data may include a subset of profile data and/or other data related to the state of the MEC application. For example, the state of the MEC application may include active at which point the MEC application may currently be executing on device 106. In another example, the state of the MEC application may include inactive at which device 106 may hold data related to the MEC application but may not be currently executing the MEC application. As such, examples of the state of the MEC application may include active, terminated, inactive, provisioned, etc. Implementations of modules 114-116 may include, by way of example, instructions (e.g., stored on a machine-readable medium) that, when executed (e.g., by the MEC roaming manager 110a), implement the functionality of modules 114-116. Alternatively, or in addition, modules 114-116 may include electronic circuitry (i.e., hardware) that implements the functionality of modules 114-116.

Base stations 118a-118d service a location area such that when device(s) re-locate to the areas serviced by base stations 118a-118d, these device(s) may attach to networks 102 and 104 to continue services. Base stations 118a-118d are considered transceivers that allow connections of device 106 to networks 102 and 104. In another implementation, base stations 118a-118d are considered to be located at a base station layer (not illustrated) within each network 102 and 104. In this implementation, each base station 118a-118d and/or base station layer includes its own respective MEC stack which comprises its own MEC platform, MEC roaming manager, and cache. This allows base stations 118a-118d to communicate across to one another and transmit the state of the MEC application and associated data without retrieving from the EPC layer and/or data center layer each time device 106 is roaming. Rather, the state of the MEC application and associated data may be retrieved initially and transmitted to the appropriate MEC stacks so that device 106 continues the execution of the MEC application and services without interruption or delay. Implementations of base stations 118a-118d include, by way of example, transceivers, evolved node B (eNodeB), radio network controller, radio component, or other type of radio communication device that allows connections of device 106 to networks 102 and 104.

Figure 2:
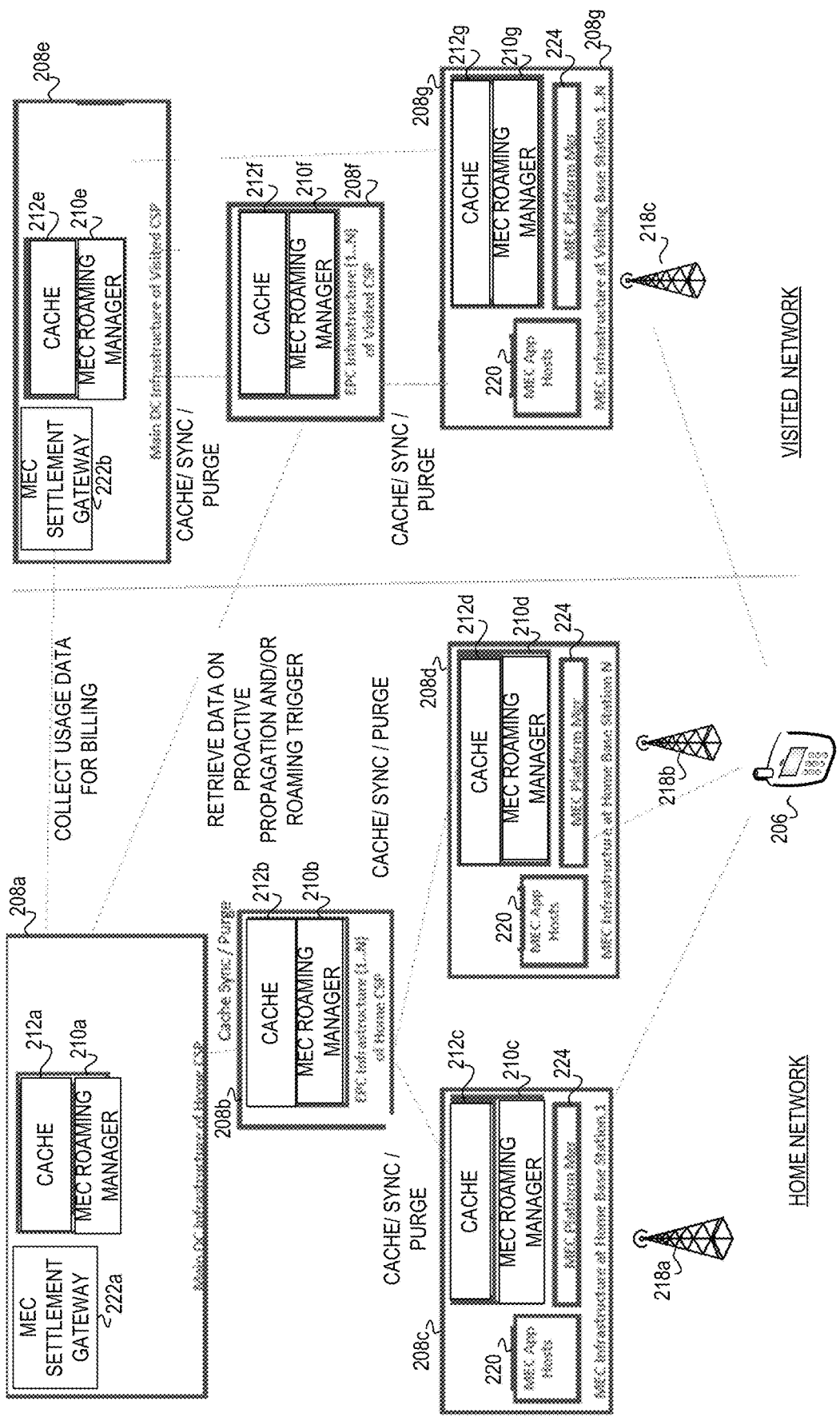
FIG. 2 illustrates an example system including a home network and outside network with multiple MEC platforms with a respective MEC roaming manager and cache in accordance with the present disclosure.

FIG. 2 illustrates an example system including a home network and partner network (e.g., visited network) that is located outside of the home network. Specifically, FIG. 2 illustrates locations of MEC platforms 208a-208g within a data center layer, evolved packet core (EPC) layer, and base station layer. Distributing MEC platforms 208a-208g with its own MEC roaming managers 210a-210g and cache 212a-212g minimize latency and disruption for operation of a MEC application when mobile device 206 executing the MEC application visits the partner network. Within each network, mobile device 206 may enter an area serviced by one of base stations 218a-218c. At the base station layer, each base station 218a-218c includes MEC platforms 208c-208d and 208g. Within each of these MEC platforms 208c-208g includes: MEC roaming manager 210c-210d and 210g; cache 212c-212d and 212g; MEC host 220; and MEC platform manager 224. MEC hosts 220 and MEC platform manager 224 may be designed according to guidelines put forth by a MEC standards organization, such as the European Telecommunication Standards Institute (ETSI). Accordingly, each of MEC hosts 220 and MEC platform managers 224 have been given the same value to illustrate these components are guided according to the MEC standards organizations. MEC platforms 208c-208d and 208g, cache 212c-212d and 212g, and MEC roaming managers 210c-210d and 210g may be similar in functionality to MEC platforms 108a-108b, cache 112a-112b, and MEC roaming mangers 110a-110b as in FIG. 1. Base stations 218a-218c and device 206 may be similar in functionality to base stations 118a-118d and device 106 as in FIG. 1.

At the EPC layer within each network includes MEC platforms 208b and 208f Each MEC platform 208b and 208f includes cache 212b and 212f and MEC roaming manager 210b and 210f The EPC layer represents the infrastructure located between base stations 218a-218c and the data center layer. MEC platforms 208b and 208f, cache 212b and 212f, and MEC roaming managers 210b and 210f may be similar in functionality to MEC platforms 108a-108b, cache 112a-112b, and MEC roaming mangers 110a-110b as in FIG. 1.

At the data center layer within each network includes MEC platforms 208a and 208e. Each MEC platform 208a and 208e includes cache 212a and 212e, MEC roaming manager 210a and 210e, and MEC settlement gateway 222a and 222b. MEC platforms 208a and 208e, cache 212a and 212e, and MEC roaming managers 210a and 210e may be similar in functionality to MEC platforms 108a-108b, cache 112a-112b, and MEC roaming mangers 110a-110b as in FIG. 1. MEC settlement gateways 222a and 222b are components that collects usage data of device 206 within each respective network. MEC settlement gateways 222a and 222b collect data such as services being rendered to device 206, time of service, etc. This usage data aids the service provider managing the home network to appropriately bill device 206 based on the usage data.

Turning to an example, assume device 206 moves from base station 218b within the home network to base station 218c within the visited network. In this example, MEC platform 208g may obtain the state of the MEC application and associated data by proactive propagation or triggered by device 206 roaming within the visited network. With proactive propagation, MEC platform 208b at the EPC layer retrieves the state of the MEC application from the MEC platform 208a at the data center layer and caches this data and transmits to MEC platforms 208c-208d at the base station layer. Additionally, the state of the MEC application and associated data may be transmitted to those MEC platforms located adjacently to MEC platforms 208c-208d. With proactive propagation, MEC platform 208a at the data center layer may periodically transmit the data to the MEC platforms adjacently located to where device 206 is currently residing. In keeping with the previous example, the state of the MEC application and associated data is synchronized on a periodic basis to the MEC platform 208g at base station 218c. With the roaming trigger, upon device 206 reaching base station 218c this triggers MEC platform 208g to request data from the MEC platform 208f which retrieves data from the data center layer. Once device 206 moves out of the home network to base station 218c within visited network, the MEC platforms 208a-208d in the home network may purge the cached state of the MEC application and associated data.

Figure 3:
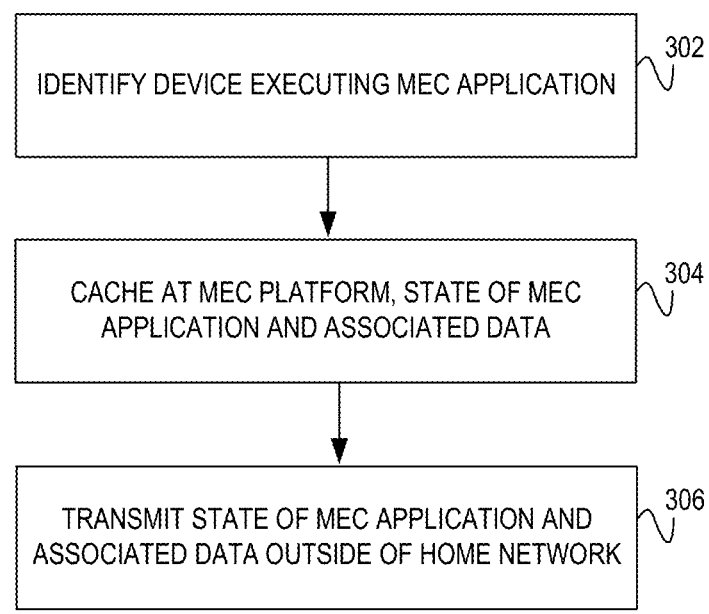
FIG. 3 illustrates an example flow diagram executable by a computing device to transmit a state of a MEC application and data to a MEC platform located outside of a home network in accordance with the present disclosure.
Figure 4:
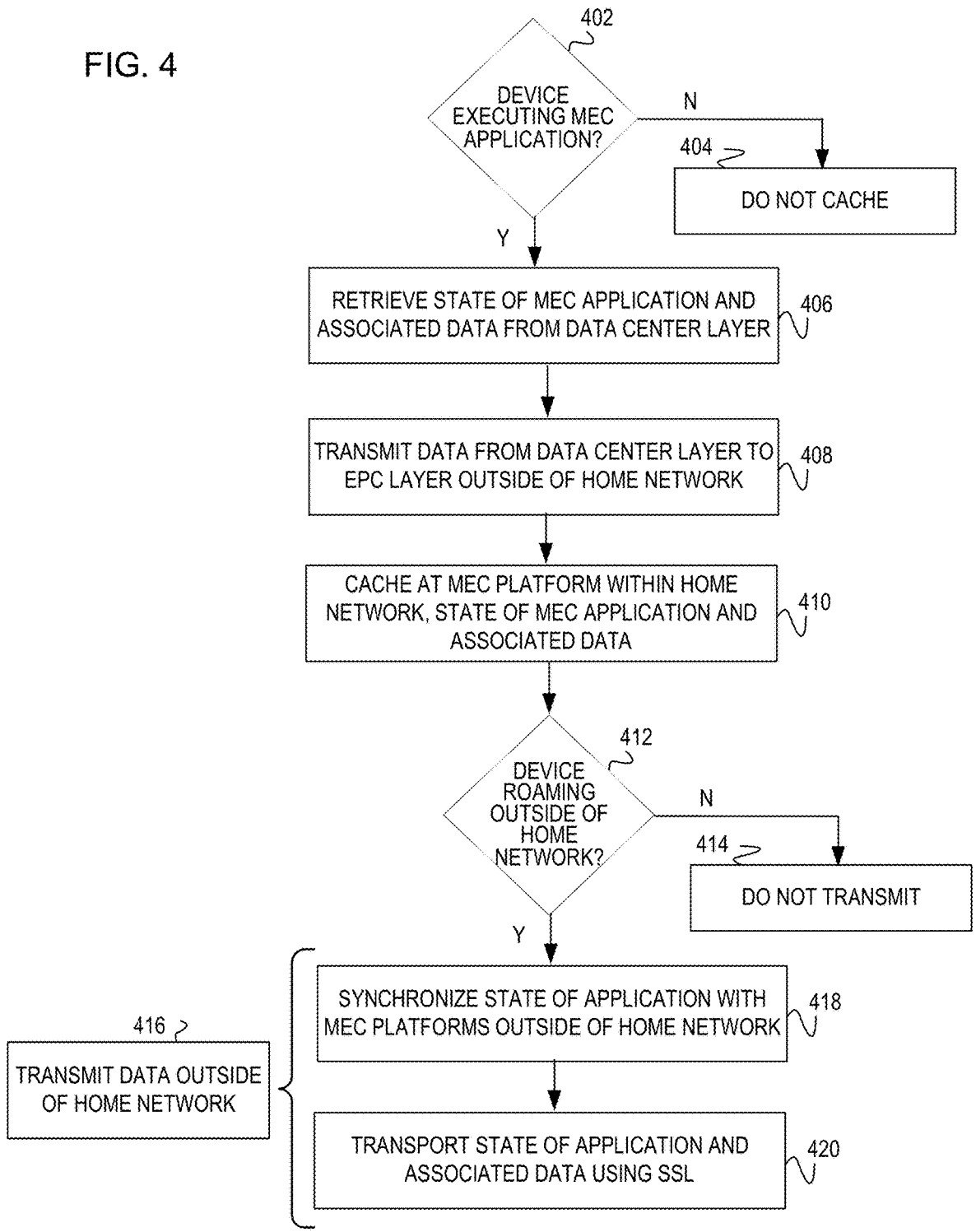
FIG. 4 illustrates an example flow diagram executable by a computing device to synchronize a state of a MEC application and associated data with a MEC platform located outside of a home network in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 illustrates a flow diagram executable by a computing device to transmit a state of MEC application and associated data outside of a device's home network. The computing device initially identifies the device that is executing a MEC application and/or capable of executing the MEC application. In response to the identification of the device, the computing device caches a state of the MEC application and associated data at a MEC platform within the home network. Based on caching the state of the MEC application and associated data, the computing device transmits the state of the MEC application and associated data to other MEC platforms that may be located adjacently to the MEC platform within the home network. In discussing FIG. 3, references may be made to the components in FIGS. 1-2 to provide contextual examples. In one implementation, MEC platform 104 and 204 as in FIGS. 1-2 executes operations 302-306 to transmit a state of the MEC application and associated data to MEC platforms outside of a home network. In another implementation, a processing resource (not illustrated) executes operations 302-306. Although FIG. 3 is described as implemented by the computing device, it may be executable on other suitable hardware components. For example, FIG. 3 may be implemented in the form of executable instructions on a machine-readable storage medium 504 and 604 as in FIGS. 5-6.

At operation 302, the computing device identifies that device that is capable of executing the MEC application and/or currently executing the MEC application. As such, the computing device may identify the device by its address to distinguish the device from among other devices. In another implementation, the computing device may maintain a list of those devices that are capable of executing the MEC application. In this implementation, based on a communication from the device within the home networking, the computing device is able to identify the device. In another implementation, the computing device identifies if the device is currently roaming outside of the home network. In this implementation, the state of the application and associated data are transmitted to that MEC platform that is servicing the device. This implementation may be discussed in detail in a later figure.

At operation 304, the computing device caches at the MEC platform within the home network, the state of the MEC application and the associated data for the device. In this implementation, the MEC platform is coupled with a storage to cache the state and associated data. The state of the MEC application is the condition that the MEC application is in at a specific time. For example, the state of the MEC application may be communicating its status within a network to track a particular device to a specific edge. As such, this state may be transmitted to the other MEC platforms so that when the device enters the region serviced by those MEC platforms, the MEC application may continue service without interruption. The associated data may include a subset or full profile data that corresponds to the device. This allows the device to continue service without re-authentication at each MEC platform. Assuming, the network in which the device roams has an agreement in place, the MEC platform in the network outside of the home network can obtain the state of the MEC application and associated data for that device from the home network.

At operation 306, the computing device transmits the state of the MEC application and associated data to other MEC platform(s) outside of the home network. The other MEC platform(s) may initially send a request for the transmission of the state of the MEC application and associated data upon the determination that the device is roaming in the area serviced by the other MEC platform(s). In a further implementation, the computing device may periodically synchronize the state of the MEC application and associated data with the MEC platform(s) located outside of the home network. In another implementation, the MEC platform within the home network that initially caches the state and associated data, may in turn transmit this data to other MEC platform(s) adjacently to the home network MEC platform. The computing device may utilize a security protocol such as a secure sockets layer (SSL) to transport the state of the MEC application and associated data to the other MEC platform(s) located outside of the home network. This implementation is discussed in detail in the next figure.

FIG. 4 illustrates a flow diagram executable by a computing device to transmit a state of a MEC application executing on a device and associated data to MEC platform (s) located outside of a device's home network. In discussing FIG. 4, references may be made to the components in FIGS. 1-2 to provide contextual examples. In one implementation, MEC platform 104 and 204 as in FIGS. 1-2 executes operations 402-420 to transmit a state of the MEC application and associated data to MEC platforms outside of a home network. In another implementation, a processing resource (not illustrated) executes operations 402-420. Although FIG. 4 is described as implemented by the computing device, it may be executable on other suitable hardware components. For example, FIG. 4 may be implemented in the form of executable instructions on a machine-readable storage medium 504 and 604 as in FIGS. 5-6.

At operation 402, the computing device identifies the device executing the MEC application. Operation 402 may also include identifying those device(s) that are capable of executing the MEC application, but may not currently being executing the MEC application. Based on the computing device identifying the device executing the MEC application, the computing device may proceed to retrieve the state of the MEC application and associated data to cache at the MEC platform within the home network as at operation 406. Based on the determination that the device is not capable of executing the MEC application or not currently executing the MEC application, the computing device proceeds to operation 404 and does not cache the data. Operation 402 may be similar in functionality to operation 302 as in FIG. 3.

At operation 404 based on the computing device not identifying the device executing the MEC application, the computing device does not cache data. At this operation, the computing device may identify that the device may be capable of executing the MEC application, but may determine the MEC application is not currently executing on the device. In another implementation, the computing device may identify that the device is not capable of executing the MEC application and as such, does not cache the data over the MEC application.

At operation 406 based on the identification of the device executing the MEC application or capable of executing the MEC application, the computing device retrieves the state of the MEC application and associated data from a data center layer. The retrieval of this data may be triggered based on the device roaming in the network outside of the home network or by proactive propagation in which the MEC platform at the evolved packet core (EPC) layer retrieves the data from the data center layer. In the proactive propagation situation, one of the MEC platforms within the home network retrieves the state of the MEC application and associated data from the data center layer and caches the data as at operation 410. Retrieving the data from the data center layer and pushing out to the MEC platform(s) that perform the computing of the MEC application at the edge reduces the latency associated with operation of the MEC application. Alternatively, the computing device may transmit the data to the MEC platform outside of the home network as at operation 408.

At operation 408, the computing device transmits the state of the MEC application and associated data from the data center layer to the MEC platform at the EPC layer outside of the home network. In this implementation, both the home network and outside of the home network (e.g., partner networks), there are multiple MEC platforms at which to cache the data; however, it may be imprudent to cache at every MEC platform. As such, the data may be transmitted to those MEC platforms that are located adjacently to the MEC platform at which the device may be located.

At operation 410, the computing device caches at one of the MEC platforms within the home network, the state of the MEC application and associated data of the device. In this operation, the computing device may cache the data at the MEC platform at the EPC layer and/or base station layer. Operation 410 may be similar in functionality to operation 304 as in FIG. 3.

At operation 412, the computing device determines that the device is roaming outside of the home network. In this operation, the device may be roaming in a partner's network that is serviced by a different MEC platform. As such, based on the determination that the device is outside of the home network, the computing device may synchronize the state of the MEC application and associated data as at operation 418. Based on the determination that the device is not roaming outside of the home network, the computing device proceeds to operation 414 and does not transmit the state of the MEC application and associated data.

At operation 414 based on the determination that the device is not roaming outside of the home network, the computing device proceeds to not transmit the state of the MEC application and associated data. This may indicate that the device is currently residing within the home network, thus the data may be transmitted within the home network rather than to the roaming network.

At operation 416 based on the determination that the device is roaming outside of the home network and within the partner's network, the computing device transmits the state of the MEC application and associated data to the MEC platforms located at adjacent base stations to the device. This ensures the device continues execution of the MEC application without interruption and/or latency. In one implementation, the computing device may synchronize the data between the MEC platform at which the device is currently residing and those adjacent MEC platforms as at operation 418. Operation 416 may be similar in functionality to operation 306 as in FIG. 3.

At operation 418, the computing device synchronizes the state of the MEC application with MEC platforms located outside of the home network. In this operation, the computing device may synchronize to the state of the MEC application with those MEC platforms that are located adjacently to the MEC platform at which the device is currently residing. In another implementation, the computing device may periodically synchronize the state of the MEC application and associated with the MEC platforms outside of the home network. Yet, in a further implementation, the computing device may be triggered to synchronize the state of the MEC application when the device identified at operation 402 enters one of the partner's networks.

At operation 420, the computing device transports the state of the MEC application and associated data that is transmitted at operations 416-420 using a security mechanism such as an SSL security mechanism. Using the security mechanism to transport the data provides security by encrypting data pertaining to the device.

Figure 5:
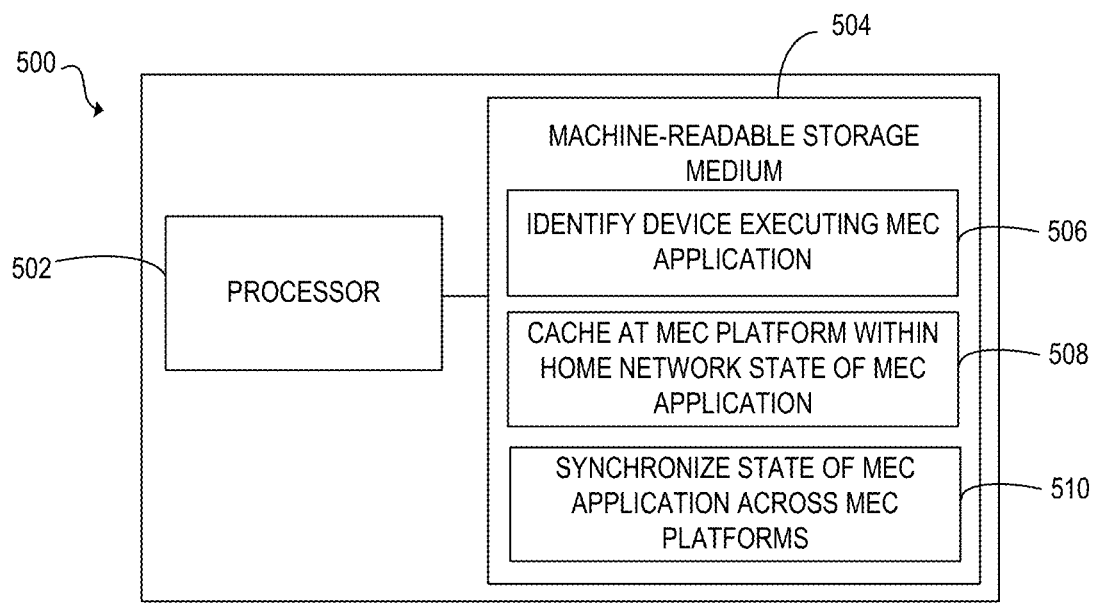
FIG. 5 is a block diagram of an example computing device with a processing resource to execute instructions in a machine-readable storage medium to transmit a state of a MEC application to MEC platforms outside of a home network in accordance with the present disclosure.
Figure 6:
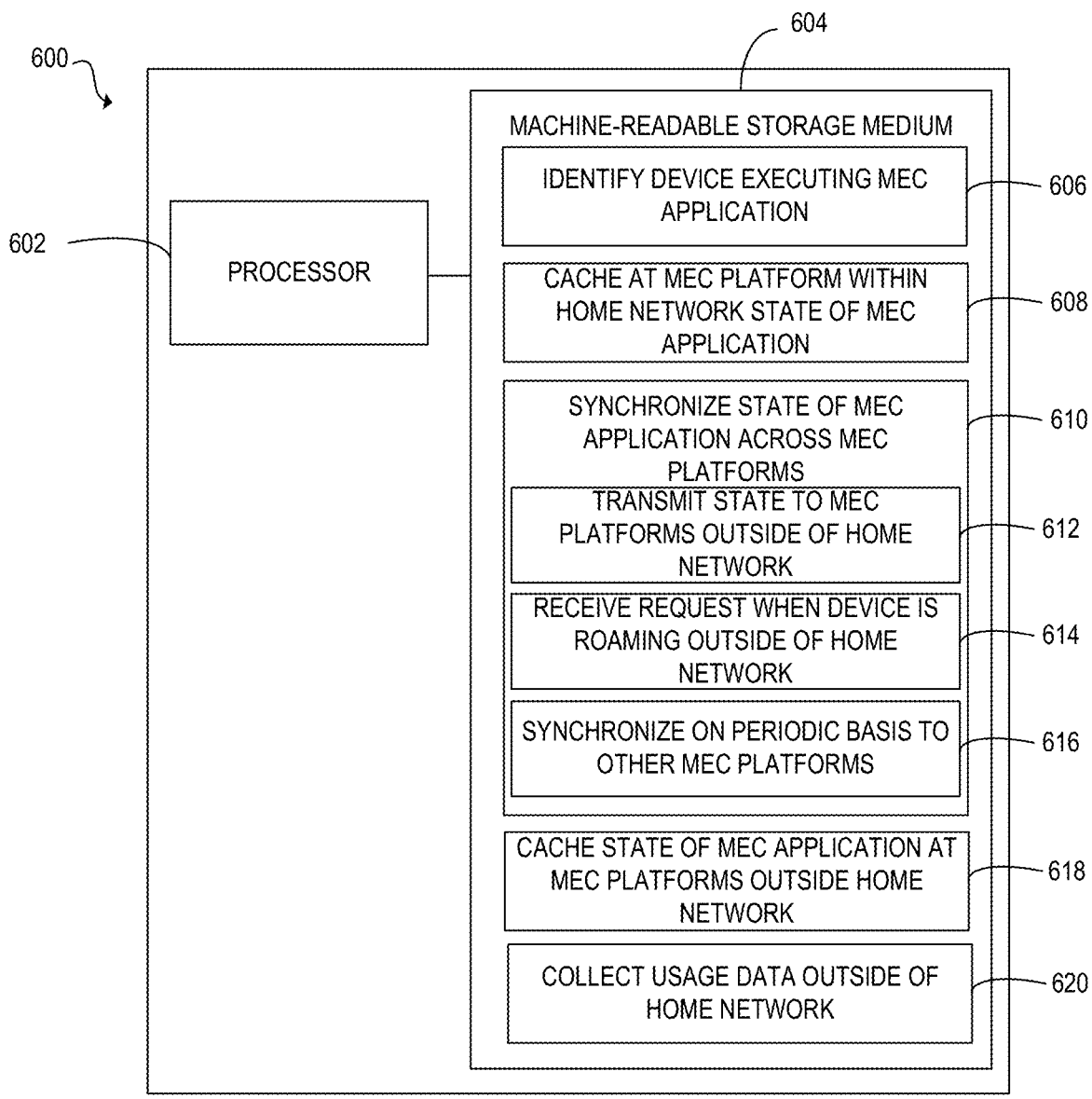
FIG. 6 is a block diagram of an example computing device with a processing resource to execute instructions in a machine-readable storage medium to synchronize a state of a MEC application across MEC platforms within a home network and outside of the home network in accordance with the present disclosure.

Referring now to FIGS. 5-6, example block diagrams of networking devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of networking device 500 with processing resource 502 to execute instructions 506-510 within machine-readable storage medium 504. Although networking device 500 includes processing resource 502 and machine-readable storage medium 504, it may also include other components that would be suitable to one skilled in the art. For example, networking device 500 may include a controller, memory storage, or other suitable type of component. The networking device 500 is an electronic device with processing resource 502 capable of executing instructions 506-510 and as such embodiments of the networking device 500 include a computing device such as a server, switch, router, wireless access point (WAP), or other type of networking device. Other embodiments of the networking device 500 include an electronic device such as a laptop, personal computer, mobile device, or other type of electronic device capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 to transmit the state of the MEC application outside of the home network Specifically, the processing resource 502 executes instructions 506-510 to: identify the device, within its home network, executing or capable of executing the MEC application; in response to the identification of the device, cache the state of the MEC application and associated data at a MEC platform within the home network; and in turn, synchronize the state of the MEC application and the associated data with MEC platforms located outside of the home network.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of networking device 500.

FIG. 6 is a block diagram of networking device 600 with processing resource 602 to execute instructions 606-620 within machine-readable storage medium 604. Although networking device 600 includes processing resource 602 and machine-readable storage medium 604, it may also include other components that would be suitable to one skilled in the art. For example, networking device 600 may include a controller, memory storage, or other suitable type of component. The networking device 600 is an electronic device with processing resource 602 capable of executing instructions 606-620 and as such embodiments of the networking device 600 include a computing device such as a server, switch, router, wireless access point (WAP), or other type of networking device. Other embodiments of the networking device 600 include an electronic device such as a laptop, personal computer, mobile device, or other type of electronic device capable of executing instructions 606-620. The instructions 606-620 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-620 to transmit the state of the MEC application outside of the home network Specifically, the processing resource 602 executes instructions 606-620 to: identify a device that is executing the MEC application; in response to the identification of the device executing the MEC application, cache at a MEC platform located within the home network, the state of the MEC application and associated data corresponding to the device; synchronize the state of the MEC application and associated data across MEC platforms located outside of the home network by synchronizing on a periodic basis to the MEC platforms and/or receiving a request from one of the MEC platforms located outside of the home network, when the device is roaming outside of the home network; transmit the state of the application and associated data to the MEC platforms outside of the home network; cache the state of the MEC application and the associated data at the MEC platforms located outside of the home network; and collect usage data about the device operating at the roaming network for billing purposes by the home network.

The machine-readable storage medium 604 includes instructions 606-620 for the processing resource 502 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 602 to fetch, decode, and/or execute instructions of machine-readable storage medium 604. The application and/or firmware may be stored on machine-readable storage medium 604 and/or stored on another location of networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

I claim:

1. A method comprising:
   identifying, by a home network comprising a multi-access edge computing (MEC) platform, a mobile device that is executing a MEC application;
   in response to the identification of the mobile device executing the MEC application, caching, at the MEC platform within the home network for the mobile device, a state of the MEC application executing on the mobile device and associated data for the mobile device; and transmitting, by the MEC platform within the home network for the mobile device, the state of the MEC application executing on the mobile device and associated data to a different MEC platform located outside of the home network, wherein the first transmission transmitting of the state of MEC application executing on the mobile device and associated data occurs absent receiving an indication of the mobile device roaming outside of the home network, wherein a first base station from the home network also transmits the state of the MEC application during a second transmission, and wherein the first transmission of the state of the MEC application by the MEC platform is transmitted at a data center layer and the second transmission of the state of the MEC application by the first base station is transmitted at a base station layer.

2. The method of claim 1, wherein transmitting the state of the MEC application executing on the mobile device and associated data to the different MEC platform located outside of the home network comprises:

synchronizing the state of the MEC application executing on the mobile device and associated data at adjacent base stations outside of the home network.

3. The method of claim 1, further comprising:

retrieving the state of the MEC application executing on the mobile device and associated data for the mobile device from the data center layer within the home network prior to caching at the MEC platform; and transmitting from the data center layer, the state of the MEC application executing on the mobile device and associated data for the mobile device, to an evolved packet core (EPC) layer outside of the home network.

4. The method of claim 3, further comprising:

caching, at the EPC layer outside of the home network, the state of the MEC application executing on the mobile device and associated data for the mobile device.

5. The method of claim 1, further comprising:

retrieving the state of the MEC application executing on the mobile device and associated data from the home network prior to caching.

6. The method of claim 5, further comprising:

collecting, by the MEC platform outside of the home network, usage data so that the home network is capable of billing the mobile device.

7. The method of claim 1, further comprising: synchronizing the state of the MEC application executing on the mobile device and associated data for the mobile device at an adjacent MEC platform on a periodic basis.

8. The method of claim 1, wherein transmitting the state of the MEC application executing on the mobile device and associated data to the different MEC platform located outside of the home network uses a secure sockets layer (SSL) security protocol.

9. The method of claim 1, wherein the state of the MEC application is received through proactive propagation by the home network that periodically transmits the state of MEC application executing on the mobile device to the different MEC platform located outside of the home network.

10. The method of claim 1, wherein the state identifies that the MEC application is active, inactive, or terminated.

11. A system comprising:

a roaming manager, located at an EPC layer of a home network and coupled to a cache, the roaming manager to:

identify a mobile device that is executing a multi-access edge compute (MEC) application, within the home network; and in response to the identification of the mobile device that is executing the MEC application, provide to the cache, at a MEC platform within the home network, a state of the MEC application executing on the mobile device and associated data for the mobile device; and the MEC platform, located at a data center layer of the home network, the MEC platform to:

transmit, during a first transmission, the state of the MEC application executing on the mobile device and associated data to a different roaming manager on a different MEC platform located outside of the home network, wherein a first base station from the home network also transmits the state of the MEC application during a second transmission at a base station layer.

12. The system of claim 11, further comprising the cache coupled to the roaming manager, wherein the system is further configured to:

receive the state of the MEC application executing on the mobile device and associated data; and cache the state of the MEC application executing on the mobile device and associated mobile device on the MEC platform within the home network.

13. The system of claim 11, further comprising the different roaming manager located outside of the home network and on the different MEC platform, wherein the different roaming manager is configured to:

in response to a determination that the mobile device is located outside of the home network, transmit a request for the state of the MEC application and associated data; and receive, from the data center layer within the home network, the state of the MEC application executing on the mobile device and associated data.

14. The system of claim 11, further comprising the different roaming manager, wherein the different roaming manager is configured to:

receive on a periodic basis, from the roaming manager within the home network, the state of the MEC application executing on the mobile device and associated data.

15. The system of claim 11, wherein the roaming manager is located at the EPC layer of the home network and coupled to the cache, wherein the system is further configured to:

synchronize the state of the MEC application executing on the mobile device and associated data on the different MEC platform located outside of the home network via transmission to an adjacent MEC platform outside of the home network.

16. A non-transitory machine-readable storage medium comprising instructions that when executed by a processing resource of a multi-access edge computing (MEC) platform cause the MEC platform to:

identify a mobile device executing a MEC application;

cache at the MEC platform, within a home network, a state of the MEC application executing on the mobile device and associated data of the mobile device; and synchronize the state of the MEC application executing on the mobile device and associated data of the mobile device across multiple MEC platforms located outside of the home network and located adjacent to the MEC platform within the home network, wherein the synchronizing comprises a first transmission for transmitting the state of the MEC application executing on the mobile device and associated data to the multiple MEC platforms, wherein a first base station from the home network also transmits the state of the MEC application during a second transmission, and wherein the first transmission of the state of the MEC application by the MEC platform is transmitted at a data center layer and the second transmission of the state of the MEC application by the first base station is transmitted at a base station layer.

17. The non-transitory machine-readable storage medium of claim 16, wherein to synchronize the state of the MEC application executing on the mobile device and associated data of the mobile device across the multiple MEC platforms, comprising instructions that when executed by the processing resource causes the MEC platform to:

receive a request from one of the multiple MEC platforms when the mobile device enters a location services by the one of the multiple MEC platforms outside of the home network.

18. The non-transitory machine-readable storage medium of claim 16, comprising instructions that when executed by the processing resource cause the MEC platform to:

collect usage data by a second MEC platform outside of the home network so that home network is capable of billing the mobile device.

19. The non-transitory machine-readable storage medium of claim 16, wherein to synchronize the state of the MEC application executing on the mobile device and associated data of the mobile device across the multiple MEC platforms, comprising instructions that when executed by the processing resource causes the MEC platform to:

transmit, on a periodic basis, to the multiple MEC platforms located adjacently to the MEC platform the state of the MEC application executing on the mobile device and associated data of the mobile device.

20. The non-transitory machine-readable storage medium of claim 16, comprising instructions that when executed by the processing resource causes the MEC platform to:

cache, at the multiple MEC platforms located adjacently to the MEC platform, the state of the MEC application executing on the mobile device and associated data of the mobile device.

* * * * *